(12) United States Patent
Chen

(10) Patent No.: US 11,628,712 B2
(45) Date of Patent: Apr. 18, 2023

(54) HYDROPHOBIC AUTOMOBILE RUBBER SEAL STRIP FLOCKING BELT AND PREPARATION METHOD THEREOF

(71) Applicant: Zhenglin Chen, Beijing (CN)

(72) Inventor: Zhenglin Chen, Beijing (CN)

(*) Notice: Subject to any disclaimer, the term of this patent is extended or adjusted under 35 U.S.C. 154(b) by 243 days.

(21) Appl. No.: 16/642,634

(22) PCT Filed: May 11, 2018

(86) PCT No.: PCT/CN2018/086448
§ 371 (c)(1),
(2) Date: Feb. 27, 2020

(87) PCT Pub. No.: WO2019/213930
PCT Pub. Date: Nov. 14, 2019

(65) Prior Publication Data
US 2021/0188064 A1 Jun. 24, 2021

(51) Int. Cl.
*B60J 10/80* (2016.01)
*B60J 10/16* (2016.01)
(Continued)

(52) U.S. Cl.
CPC .......... *B60J 10/80* (2016.02); *B05D 1/02* (2013.01); *B05D 1/28* (2013.01); *B29C 48/0018* (2019.02);
(Continued)

(58) Field of Classification Search
CPC .... B60J 10/80; B60J 10/16; C09J 7/10; B29C 48/0018; B05D 1/02; B05D 1/28;
(Continued)

(56) References Cited

FOREIGN PATENT DOCUMENTS

CN 101824271 A * 9/2010
CN 101824271 A 9/2010
(Continued)

OTHER PUBLICATIONS

International Search Report Application No. PCT/CN2018/086448; dated Feb. 11, 2019; pp. 4.

*Primary Examiner* — Michael M. Bernshteyn
(74) *Attorney, Agent, or Firm* — Cantor Colburn LLP

(57) ABSTRACT

The present invention discloses a hydrophobic automobile rubber seal strip flocking belt and a preparation method thereof, wherein the flocking belt comprises a flocking belt film, flocking belt glue, villi and flocking paint; the flocking glue is roller-coated or sprayed on the flocking film to form a flocking glue layer; and the villi is implanted on the flocking glue layer by high voltage static electricity in electrostatic chamber. The flocking coating is roller-coated or sprayed on the villi to form a flocking coating which comprises fluorosilicone modified waterborne polyurethane resin, polyurethane modified acrylic emulsion, organic molybdenum, organic silicon, curing agent and solvent. Accordingly, the preparation method includes such steps as film forming, glue applying, electrostatic flocking, flocking curing, spraying or roller-coating, and coating curing, etc. The flocking belt described in the present invention is installed in a guide groove of the automobile glass, which is enabled to solve the problem of abnormal noise caused by rising and falling of glass of automobile windows. In addition, the flocking coating feels soft and smooth.

12 Claims, 2 Drawing Sheets

(51) Int. Cl.
| | |
|---|---|
| *C09J 7/10* | (2018.01) |
| *B29C 48/00* | (2019.01) |
| *B05D 1/02* | (2006.01) |
| *B05D 1/28* | (2006.01) |
| *C08K 5/54* | (2006.01) |
| *C09D 175/04* | (2006.01) |
| *C09J 127/06* | (2006.01) |
| *C08K 5/00* | (2006.01) |
| *C08K 5/56* | (2006.01) |
| *B29K 21/00* | (2006.01) |

(52) U.S. Cl.
CPC ............... *B60J 10/16* (2016.02); *C08K 5/54* (2013.01); *C09D 175/04* (2013.01); *C09J 7/10* (2018.01); *C09J 127/06* (2013.01); *B05D 2503/00* (2013.01); *B29K 2021/00* (2013.01); *C08K 5/0025* (2013.01); *C08K 5/56* (2013.01)

(58) Field of Classification Search
CPC .... B05D 2503/00; C08K 5/54; C08K 5/0026; C08K 5/56
USPC ........................................................ 277/628
See application file for complete search history.

(56) References Cited

FOREIGN PATENT DOCUMENTS

| | | | | | |
|---|---|---|---|---|---|
| CN | 102585681 | A | * | 7/2012 | |
| CN | 102585681 | A | | 7/2012 | |
| CN | 106313520 | A | * | 1/2017 | |
| CN | 106700918 | A | * | 5/2017 | |
| CN | 106700918 | A | | 5/2017 | |
| CN | 107652867 | A | * | 2/2018 | ............. B29C 65/04 |
| CN | 107652867 | A | | 2/2018 | |
| CN | 107695902 | A | * | 2/2018 | ........... B24D 11/001 |
| CN | 107695902 | A | | 2/2018 | |
| WO | 9939038 | A1 | | 8/1999 | |

* cited by examiner

HYDROPHOBIC AUTOMOBILE RUBBER SEAL STRIP FLOCKING BELT AND PREPARATION METHOD THEREOF

TECHNICAL FIELD

The present invention relates to a flocking belt for an automobile seal, in particular to a hydrophobic automobile rubber seal strip flocking belt and a preparation method thereof.

BACKGROUND

With the increasing popularity of automobiles in China's society and families, it is of great importance to diagnose and find out the causes of mechanical faults during the use of automobiles and to deal with them properly. The occurrence of various mechanical faults will have a significant impact on driving safety and service efficiency of automobiles, and it will bring serious threats to personal and property safety of driver and others under serious circumstances. Therefore, for maintenance personnel or drivers, it is very important to correctly analyze and diagnose the causes of automobile mechanical failure, which helps to improve the service safety and efficiency of automobiles and better meet requirements of production and life.

Sound anomaly is a common mechanical fault of automobiles. In case of this fault, an automobile driver can hear an engine making dull or sharp sound, or rubbing sound caused by other parts due to abnormal friction. These abnormal sounds sometimes occur alternately at a certain frequency or interval, or intermittently without regularity.

Statistically, about 70% of the automobile mechanical failures involve some abnormal noise. Therefore, it is practical to diagnose the mechanical faults of automobiles by listening. With the prolonged service time of the automobile and the accelerated wear of mechanical parts, the gap between the parts during brake of the automobile becomes larger, which leads to abnormal noise frequently during its operation. It can be determined by listening to the abnormal sound of the automobile whether the rotation of the automobile is balanced or not; by analyzing the characteristics of abnormal noise, such as continuity, regularity and intermittence, the location of fault can be basically judged.

Generally, abnormal sounds might occur to places such as the guide groove of glass, door frame, trunk and skylight of the automobile. A general solution to solve the problem of abnormal sound is to use plastic or rubber seal strip or sponge strip to fill in the gap to reduce the abnormal sound of the automobile. However, reduction is not the same as elimination. The dynamic noise can still occur while the automobile in motion, and a seal or sponge strip alone cannot solve the problem in a better manner.

At present, a flocking villi layer is consciously used as a wear-resistant coating of the rubber seal strip. However, the contact between the flocking villi layer and the automobile window's glass thereon is still not close enough, especially when the automobile is in motion, the vibration of the automobile window' glass in the rising or falling process thereof still makes the automobile produce abnormal noise.

SUMMARY

The reason is that the flocking villi layer itself does not have good adhesion or wear resistance, which makes it, in the process of contact with the automobile window's glass, unable to resist the vibration of the glass when it rises or falls so that friction sliding occurs between the glass and the flocking villi layer during the vibration process when the glass rises or falls, and brings abnormal sounds.

Taking advantage of physical properties of charges that like charges repel but opposite charges attract, an electrostatic flocking process is to give the villi negative charges and place the flocking object at zero potential or grounded; the villi is attracted by the flocking object with opposite charges and flying in an accelerated and vertical manner to surface of the flocking object; as the flocking object is coated with glue, the villi is vertically attached to the flocking object; therefore, electrostatic flocking is a process taking advantages of the natural characteristics of charges.

The object of the present invention is to provide a hydrophobic automobile rubber seal strip flocking belt which is enabled to solve the problem of abnormal sound caused when the glass of automobile window rises or falls.

The technical solutions adopted are given below:

A hydrophobic automobile rubber seal strip flocking belt and a preparation method thereof, wherein the flocking belt comprises a flocking belt film, flocking belt glue, villi and flocking paint. The flocking glue is roller-coated or sprayed on the flocking film to form a flocking glue layer, and the villi is implanted on the flocking glue layer by high voltage static electricity in electrostatic chamber. The flocking coating is roller-coated or sprayed on the villi to form a flocking coating which comprises fluorosilicone modified waterborne polyurethane resin, polyurethane modified acrylic emulsion, organic molybdenum, organic silicon, curing agent and solvent.

In the technical solutions of the present invention, the application of high voltage static electricity in the electrostatic chamber to implant the villi on the flocking glue layer is an electrostatic flocking process, which allows the villi to be vertically inserted into the glue; the vertically inserted villi can be fully roller-coated or sprayed with flocking painting to form a flocking film.

In flocking coating, fluorosilicone modified waterborne polyurethane resin has adhesive property, and it can also improve the wear-resisting property and provide the hydrophobicity to the villi; the function of polyurethane modified acrylic emulsion is to increase adhesion and enhance fastness; the function of organic molybdenum is to make products soft and smooth; The function of organic silicon is to adjust the friction coefficient of the product, improve the wear-resisting performance while solvent plays the role of dissolution and dilution; curing agent plays the role of cross-linking curing.

Thus, the flocking coating has a good adhesion, on the one hand it makes the coating firmly attached to the villi, and it can, on the other hand, also be firmly attached to the glass; due to its high wear resistance, the flocking coating attached to the glass can withstand the internal molecular friction between glass and silicone resin when automobile glass rises and falls, so as to solve the problem of abnormal sound caused when the glass rises and falls.

Fluorosilicone modified waterborne polyurethane resin contains organic silicon or organic fluorine monomer modified or blended modified polyurethane resin.

Polyurethane modified acrylic emulsions, hydroxypolyurethane modified acrylic emulsions D52, for example, are available from the market.

Organic molybdenum contains organic molybdenum monomer and organic molybdenum polymer; organosilicon contains organosilicon monomers and organosilicon polymers.

Preferably, isocyanate is a curing agent.

Solvents include but not limited to alcohol ether solvents or waters.

Further, the flocking coating also comprises a defoaming agent. Preferably, the defoaming agent is polymer siloxane polymer defoaming agent, which is available from the market, Deko TEGO825 defoaming agent, for example. The function of defoaming agent is to remove foam during a dispersion process.

In order to better play the role of flocking coating, the flocking coating comprises compositions with the following weight ratios:

| | |
|---|---|
| fluorosilicone modified waterborne polyurethane resin | 15-50%; |
| organic molybdenum | 3-20%; |
| organic silicon | 3-20%; |
| deforming agent | 0.1-2%; |
| curing agent | 3-15%; and |
| solvent | 5-30%. |

The flocking coating can be prepared by mixing the above components evenly, a flocking coating is formed by roller-coating or spraying a flocking coating to the villi.

As a coating base material, the flocking film is base cloth of electrostatic flocking. Preferably, in terms of choosing flocking film materials, the flocking film can be one or more mixtures of TPV, PVC and TPE flocking films.

The flocking glue is used for bonding the villi on the base material of coating cloth, which can preferably be PU water-based flocking glue. PU water-based flocking glue is a water-based adhesive, and it may contain such materials as modified water-based polyurethane emulsion, acrylic emulsion and water-based epoxy resin; it has the functions of environmental protection, toxic free, good water resistance, firm bonding, water-washing resistance and so on. PU water-based flocking glue is available directly from the market.

Preferably, the villi may be PET or PA villi. PET villi is polyester villi; PA villi is nylon villi. PET or PA villi have good wear resistance.

Another objective of the present invention is to provide a preparation method of the hydrophobic automobile rubber seal strip flocking belt.

A preparation method of the hydrophobic automobile rubber seal strip flocking belt, which comprises:

step 1: applying the flocking glue to the flocking film by means of roller-coating or spraying;

step 2: using high voltage static electricity in electrostatic chamber to implant the villi into the flocking glue layer and putting the belt into a drying tunnel for baking and curing; the semi-finished flocking belt can be obtained by means of rolling after it leaves the drying tunnel;

step 3: putting the semi-finished flocking belt into the unrolling table to spray or roller-coat it with the prepared flocking coating, and then putting it into the drying tunnel for baking and curing, and step 4: winding after leaving the drying tunnel, slitting, fine cutting, rewinding and packaging.

The advantages of the present invention are as follows:

The flocking belt described in the present invention is installed in a guide groove of the automobile glass, to test the loudness when the automobile is in motion, and the test results are less than 3 sones (unit of loudness), which solves the problem of abnormal noise caused by rising and falling of glass of automobile windows. In addition, the flocking coating feels soft and smooth.

The flocking belt in the present invention is applicable to the filed of flocking on the surface of automobile rubber seal strip, which includes but not limited to flocking on automobile glass sealing strip and sponge strip surface.

EMBODIMENTS OF THE PRESENT INVENTION

Figure 1:
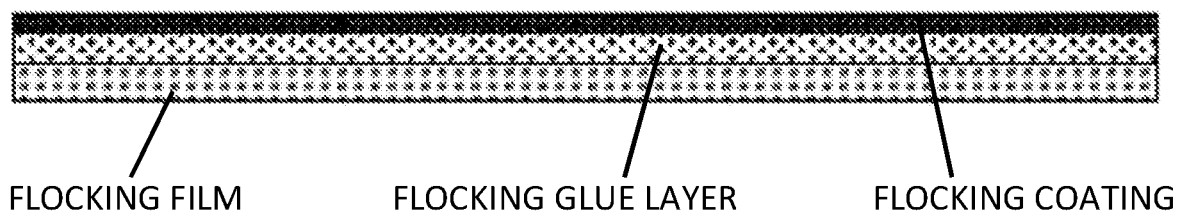
FIG. 1. Is a side view of a flocking belt in which the bottom structure layer is a flocking film, the middle structure layer is a flocking glue layer and the top structure layer is a flocking coating.
Figure 2:
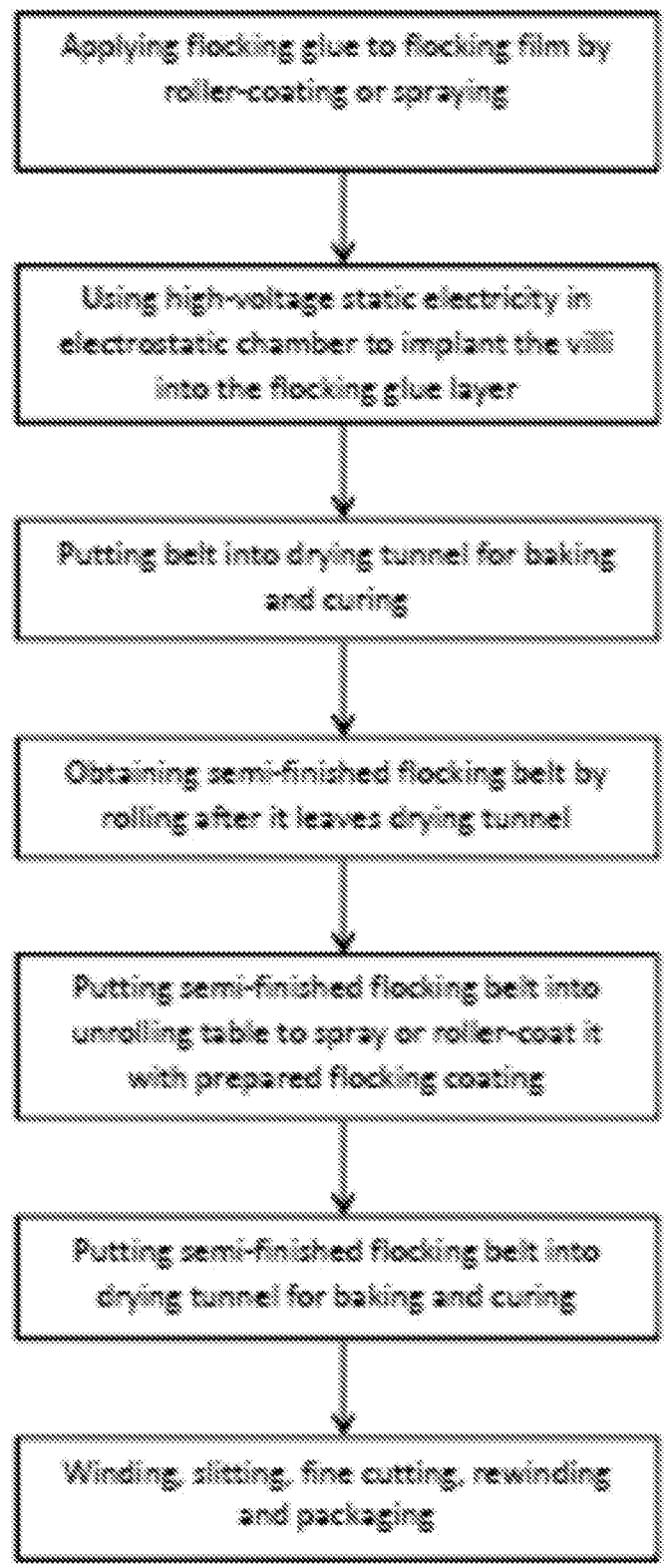
FIG. 2 is a flow diagram illustrating a method of forming a flocking belt.

The technical solution of the invention is further described below in conjunction with preferred embodiments, but the scope of protection required by the present invention is not limited to this.

Embodiment 1

A hydrophobic automobile rubber seal strip flocking belt, which comprises TPV flocking film, PU water-based flocking glue, PET villi and flocking paint. PU water-based flocking glue is roller-coated or sprayed on the TPV flocking film to form a flocking glue layer, and the PET villi is implanted on the flocking glue layer by high voltage static electricity in electrostatic chamber. The flocking coating is roller-coated or sprayed on the PET villi to form a flocking coating which comprises compositions with the following weight ratios:

| | |
|---|---|
| fluorosilicone modified waterborne polyurethane resin | 50%; |
| organic molybdenum | 10%; |
| organic silicon | 10%; |
| deforming agent | 0.2%; |
| isocyanate curing agent | 14%; and |
| water | 15.8%. |

The preparation method of the hydrophobic automobile rubber seal strip flocking belt is as follows:

step 1: applying the PU water-based flocking glue to the TPV flocking film by means of roller-coating or spraying;

step 2: using high voltage static electricity in electrostatic chamber to implant the PET villi into the flocking glue layer and putting the belt into a drying tunnel for baking and curing; the semi-finished flocking belt can be obtained by means of rolling after it leaves the drying tunnel;

step 3: putting the flocking belt into the unrolling table to spray or roller-coat it with the flocking coating prepared as per the process, and then putting it into the drying tunnel for baking and curing; and step 4: winding after leaving the drying tunnel, slitting, fine cutting, rewinding and packaging to obtain the blocking belt.

Embodiment 2

A hydrophobic automobile rubber seal strip flocking belt, which comprises TPV/PVC flocking film, PU water-based flocking glue, PET villi and flocking paint. PU water-based flocking glue is roller-coated or sprayed on the TPV/PVC flocking film to form a flocking glue layer, and the PET villi is implanted on the flocking glue layer by high voltage static electricity in electrostatic chamber. The flocking coating is roller-coated or sprayed on the PET villi to form a flocking coating which comprises compositions with the following weight ratios:

| | |
|---|---|
| fluorosilicone modified waterborne polyurethane resin | 40%; |
| organic molybdenum | 15%; |
| organic silicon | 15%; |
| deforming agent | 0.5%; |
| isocyanate curing agent | 10%; and |
| water | 19.5%. |

The preparation method of the hydrophobic automobile rubber seal strip flocking belt is as follows:

step 1: applying the PU water-based flocking glue to the TPV/PVC flocking film by means of roller-coating or spraying;

step 2: using high voltage static electricity in electrostatic chamber to implant the PET villi into the flocking glue layer and putting the belt into a drying tunnel for baking and curing; the semi-finished flocking belt can be obtained by means of rolling after it leaves the drying tunnel;

step 3 putting the flocking belt into the unrolling table to spray or roller-coat it with the flocking coating prepared as per the process, and then putting it into the drying tunnel for baking and curing; and step 4: winding after leaving the drying tunnel, slitting, fine cutting, rewinding and packaging to obtain the blocking belt Embodiment 3

A hydrophobic automobile rubber seal strip flocking belt, which comprises TPV/PVC/TPE flocking film, PU water-based flocking glue, PA villi and flocking paint. PU water-based flocking glue is roller-coated or sprayed on the TPV/PVC/TPE flocking film to form a flocking glue layer, and the PA villi is implanted on the flocking glue layer by high voltage static electricity in electrostatic chamber. The flocking coating is roller-coated or sprayed on the PA villi to form a flocking coating which comprises compositions with the following weight ratios:

| | |
|---|---|
| fluorosilicone modified waterborne polyurethane resin | 30%; |
| organic molybdenum | 20%; |
| organic silicon | 20%; |
| deforming agent | 0.4%; |
| isocyanate curing agent | 6%; and |
| water | 23.6%. |

The preparation method of the hydrophobic automobile rubber seal strip flocking belt is as follows:

step 1: applying the PU water-based flocking glue to the TPV/PVC/TPE flocking film by means of roller-coating or spraying;

step 2: using high voltage static electricity in electrostatic chamber to implant the PA villi into the flocking glue layer and putting the belt into a drying tunnel for baking and curing; the semi-finished flocking belt can be obtained by means of rolling after it leaves the drying tunnel;

step 3: putting the flocking belt into the unrolling table to spray or roller-coat it with the flocking coating prepared as per the process, and then putting it into the drying tunnel for baking and curing; and step 4: winding after leaving the drying tunnel, slitting, fine cutting, rewinding and packaging to obtain the blocking belt.

The flocking belt of hydrophobic automobile rubber seal strip made from the above embodiment 1-3 is installed in a guide groove of the automobile glass, to test the loudness when the automobile is in motion, and the test results are less than 3 sones (unit of loudness), and the flocking coating feels soft and smooth.

Thus, the hydrophobic automobile rubber seal strip flocking belt of the present invention can solve the problem of abnormal noise caused by rising and falling of glass of automobile windows, and the flocking coating feels soft and smooth.

What is claimed is:

1. A hydrophobic automobile rubber seal strip flocking belt, comprising:
    a flocking belt film,
    flocking belt glue,
    nylon villi, and
    flocking paint,
    wherein the flocking glue is roller-coated or sprayed on the flocking film to form a flocking glue layer, the nylon villi is implanted on the flocking glue layer by high voltage static electricity in electrostatic chamber, and the flocking paint is roller-coated or sprayed on the nylon villi to form a flocking coating which comprises one or more of fluorosilicone modified waterborne polyurethane resin, polyurethane modified acrylic emulsion, organic molybdenum, organic silicon, curing agent and solvent.

2. A hydrophobic automobile rubber seal strip flocking belt according to claim 1, wherein the flocking coating further comprises a defoaming agent.

3. A hydrophobic automobile rubber seal strip flocking belt according to claim 2, wherein the flocking coating comprises compositions with the following weight ratios:

| | |
|---|---|
| Fluorosilicone modified waterborne polyurethane resin | 15-50%, |
| organic molybdenum | 3-20%, |
| organic silicon | 3-20%, |
| deforming agent | 0.1-2%, |
| curing agent | 3-15%, |
| solvent | 5-30%. |

4. A hydrophobic automobile rubber seal strip flocking belt according to claim 3, wherein the curing agent is an isocyanate; and the solvent is an alcohol ether.

5. A hydrophobic automobile rubber seal strip flocking belt according to claim 3, wherein the defoaming agent is a high molecular polymer defoaming agent.

6. A hydrophobic automobile rubber seal strip flocking belt according to claim 1, wherein the flocking film is one or more mixtures of TPV, PVC and TPE flocking films.

7. A hydrophobic automobile rubber seal strip flocking belt according to claim 1, wherein the flocking glue is PU water-based flocking glue.

8. A preparation method of the hydrophobic automobile rubber seal strip flocking belt according to claim 1, wherein the method comprises the following steps:
    step 1: applying the flocking glue to the flocking film by roller-coating or spraying;
    step 2: using high voltage static electricity in electrostatic chamber to implant the nylon villi into the flocking glue layer and putting the belt into a drying tunnel for baking and curing, wherein the semi-finished flocking belt is obtained by rolling after it leaves the drying tunnel; and step 3: putting the semi-finished flocking belt into the unrolling table to spray or roller-coat it with the prepared flocking coating, and then putting it into the drying tunnel for baking and curing.

9. A preparation method of the hydrophobic automobile rubber seal strip flocking belt according to claim 8, wherein the method further comprises step 4: winding after leaving the drying tunnel, slitting, fine cutting, rewinding and packaging.

10. A hydrophobic automobile rubber seal strip flocking belt according to claim 1, wherein the nylon villi are implanted on the flocking glue layer vertically by the high voltage static electricity.

11. A hydrophobic automobile rubber seal strip flocking belt, comprising:
   a flocking belt film,
   flocking belt glue,
   nylon villi, and
   flocking paint, wherein the flocking glue forms a flocking glue layer on the flocking film and the nylon villi are implanted on the flocking glue layer by high voltage static electricity, and the flocking paint is roller-coated or sprayed on the nylon villi to form a flocking coating which comprises compositions with the following weight ratios:

| | |
|---|---|
| Fluorosilicone modified waterborne polyurethane resin | 15-50%, |
| organic molybdenum | 3-20%, |
| organic silicon | 3-20%, |
| deforming agent | 0.1-2%, |
| isocyanate | 3-15%, |
| alcohol ether | 5-30%. |

12. A hydrophobic automobile rubber seal strip flocking belt according to claim 11, wherein the nylon villi are implanted on the flocking glue layer vertically by the high voltage static electricity.

* * * * *